United States Patent [19]

Rolinski et al.

[11] Patent Number: 5,251,723
[45] Date of Patent: * Oct. 12, 1993

[54] SERVICE BRAKE AND SHIFT LEVER INTERLOCK SYSTEM

[75] Inventors: Adam E. Rolinski, Grand Haven; Greg R. Pattok, Spring Lake, both of Mich.

[73] Assignee: Sparton Corporation, Jackson, Mich.

[*] Notice: The portion of the term of this patent subsequent to May 28, 2008 has been disclaimed.

[21] Appl. No.: 872,172

[22] Filed: Apr. 22, 1992

Related U.S. Application Data

[63] Continuation of Ser. No. 591,605, Oct. 2, 1990, Pat. No. 5,129,494, which is a continuation of Ser. No. 314,717, Feb. 23, 1989, Pat. No. 5,018,610.

[51] Int. Cl.$^5$ ............................................. B60K 41/28
[52] U.S. Cl. ...................................... 192/4 A; 74/878; 70/248
[58] Field of Search ....................... 192/4 R, 4 A, 4 C; 74/473 R, 483 R, 878; 180/271; 70/245, 247, 248, 254

[56] References Cited

U.S. PATENT DOCUMENTS

| | | | |
|---|---|---|---|
| 3,942,614 | 3/1976 | Thompson | 192/4 A |
| 4,187,935 | 2/1980 | O'Hern | 192/4 A |
| 4,473,141 | 9/1984 | Mochida | 192/4 A X |
| 4,572,340 | 2/1986 | Pierce | 192/4 C |
| 4,660,443 | 4/1987 | Simancik | 74/878 |
| 4,768,610 | 9/1988 | Pagel et al. | 180/271 |
| 4,880,092 | 11/1989 | Kito et al. | 192/4 A |
| 4,887,702 | 12/1989 | Radke et al. | 192/4 A |
| 4,934,496 | 6/1990 | Barske et al. | 192/4 A |
| 5,018,610 | 5/1991 | Rolinski et al. | 192/4 A |

FOREIGN PATENT DOCUMENTS

| | | | |
|---|---|---|---|
| 1203756 | 4/1986 | Canada | 192/4 A |
| 246353 | 11/1987 | European Pat. Off. | 180/336 |
| 61-116163 | 6/1986 | Japan | 180/336 |

Primary Examiner—Richard M. Lorence
Attorney, Agent, or Firm—Reising, Ethington, Barnard, Perry & Milton

[57] ABSTRACT

A service brake and shift lever interlock system for a vehicle is operably controlled by a logic control circuit to prevent movement of the shift lever from the "Park" position when the ignition switch is in the "Start" or "Run" position and the service brake pedal is in a brake release position (i.e., the vehicle brakes are not applied). The interlock system does not prevent movement of the shift lever from the "Park" position under other conditions when the ignition switch is in the "Start" or "Run" position. An ignition interlock system prevents movement of the shift lever from the "Park" position when the ignition switch is in the "Lock" position.

3 Claims, 10 Drawing Sheets

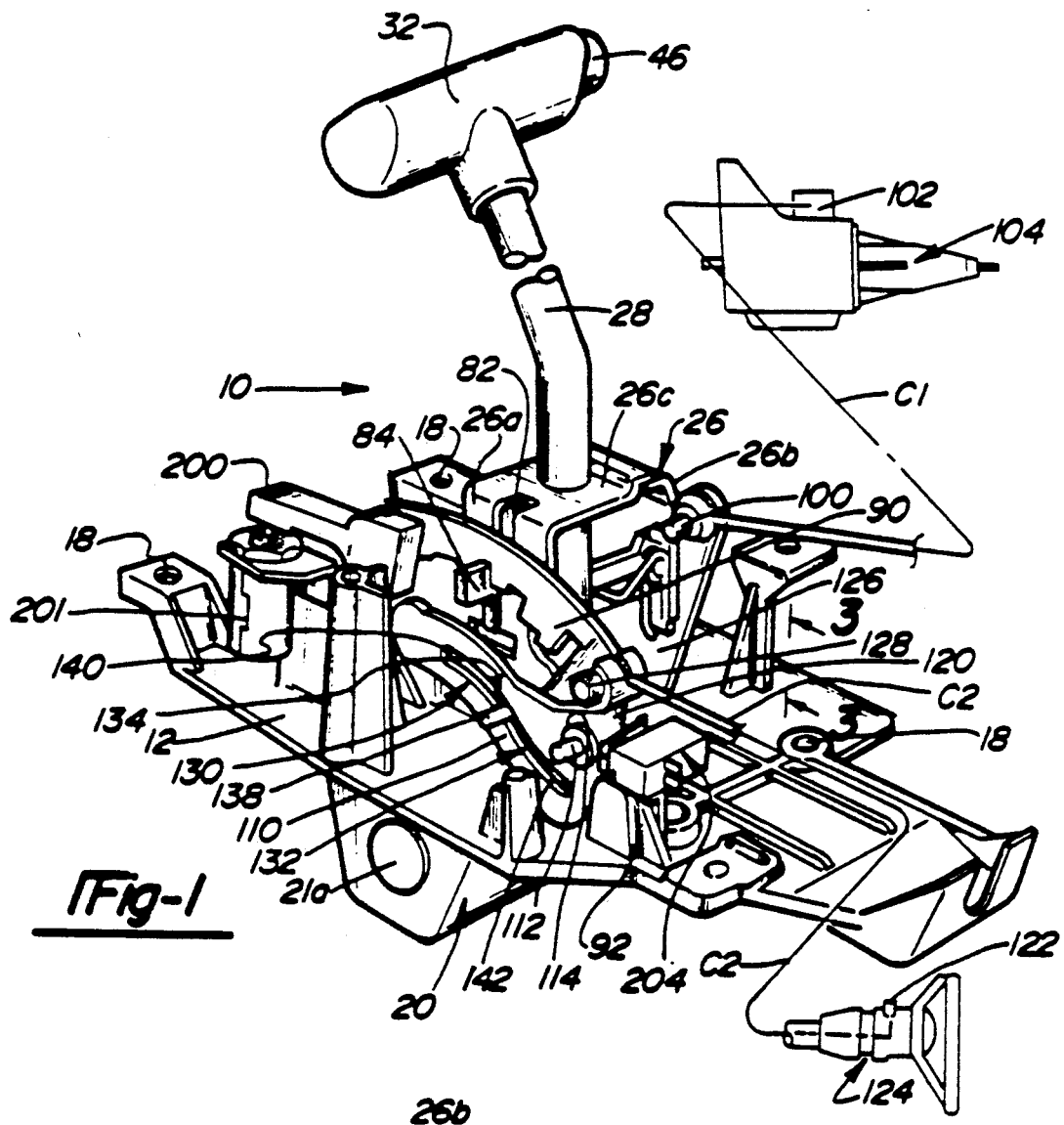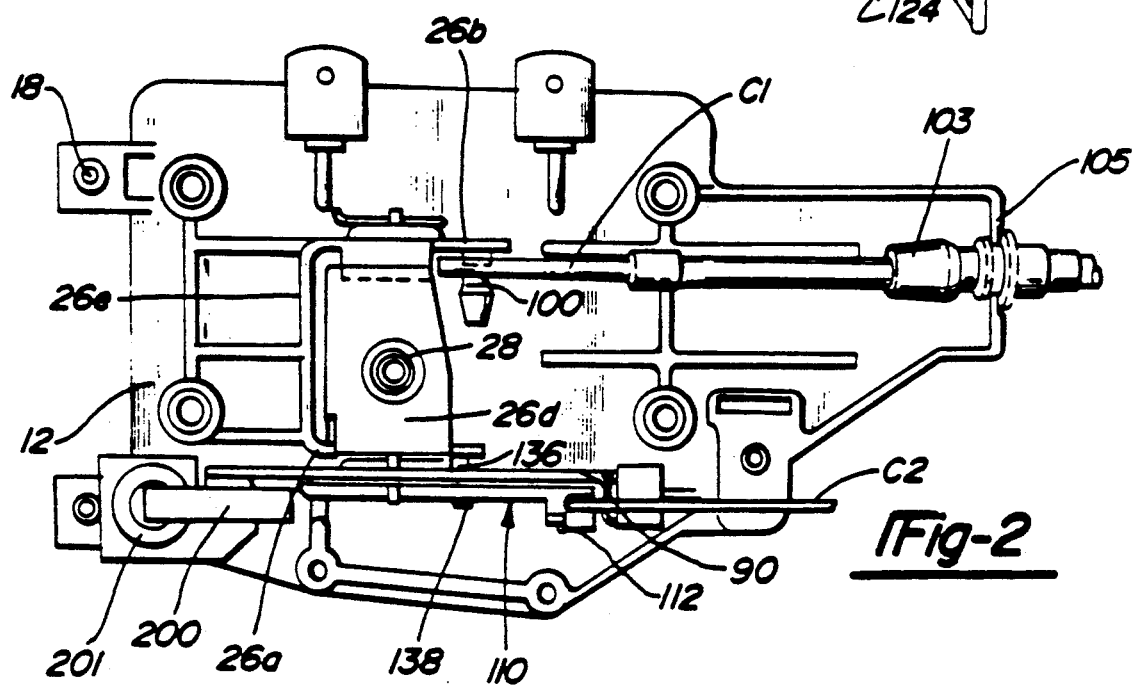

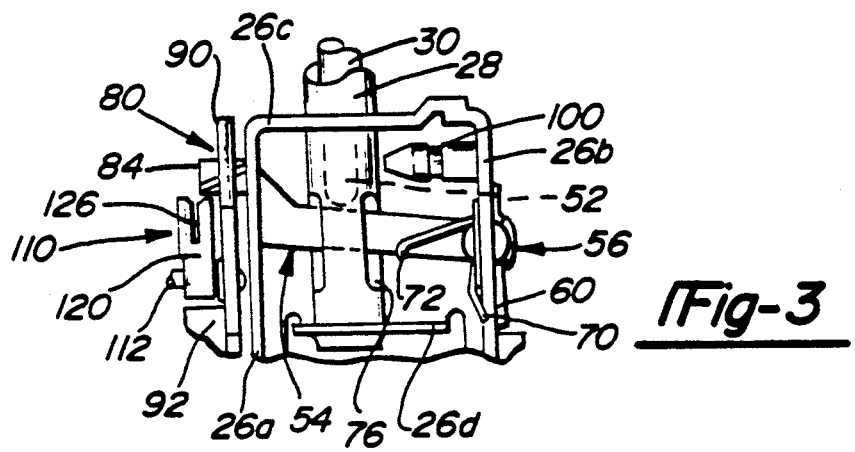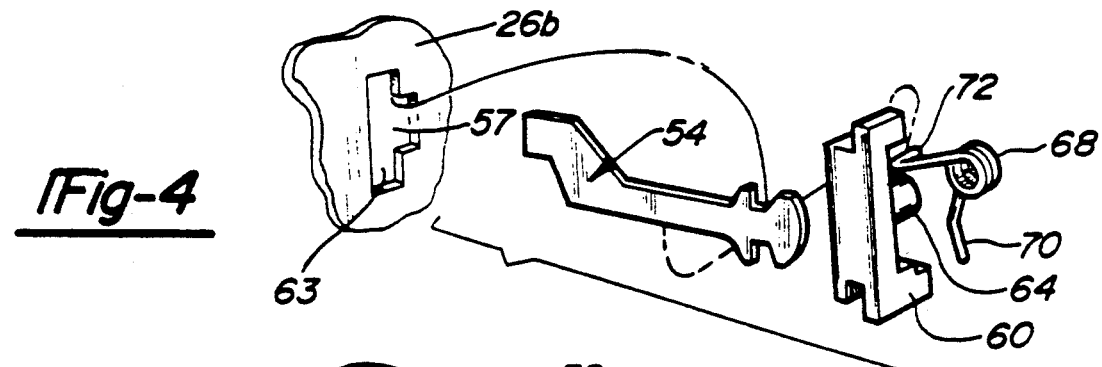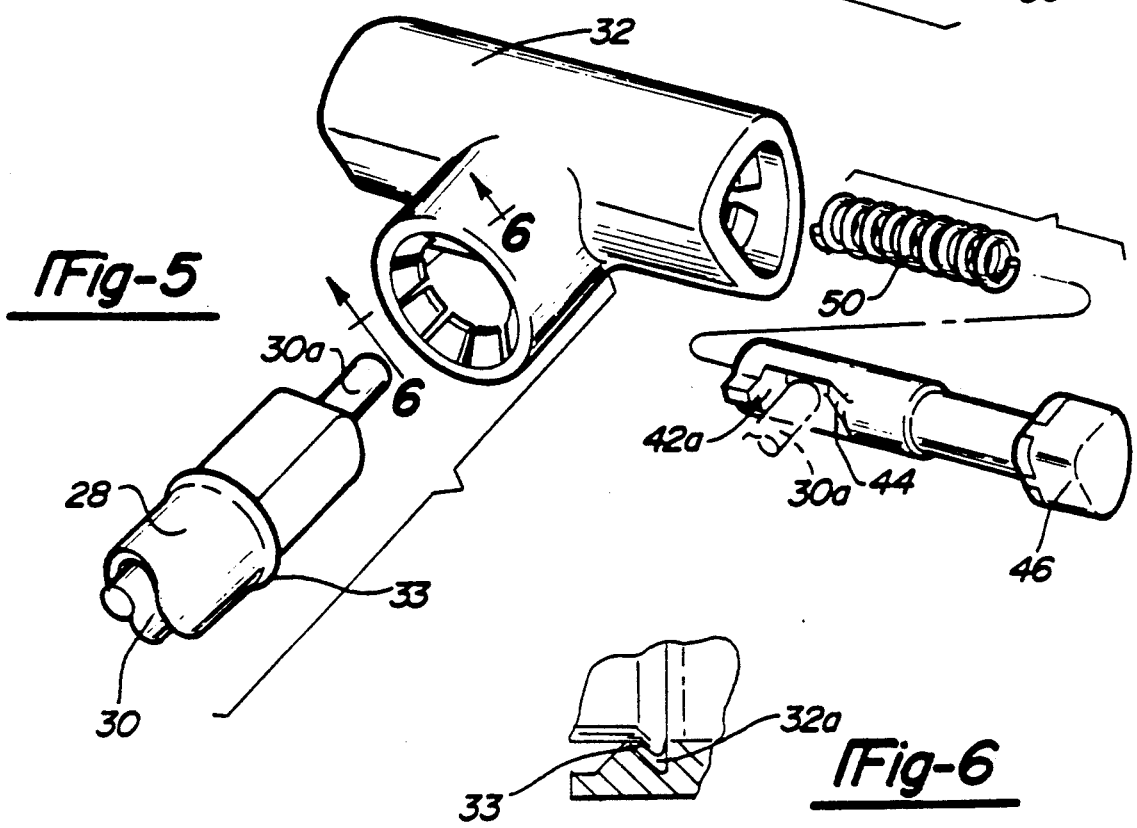

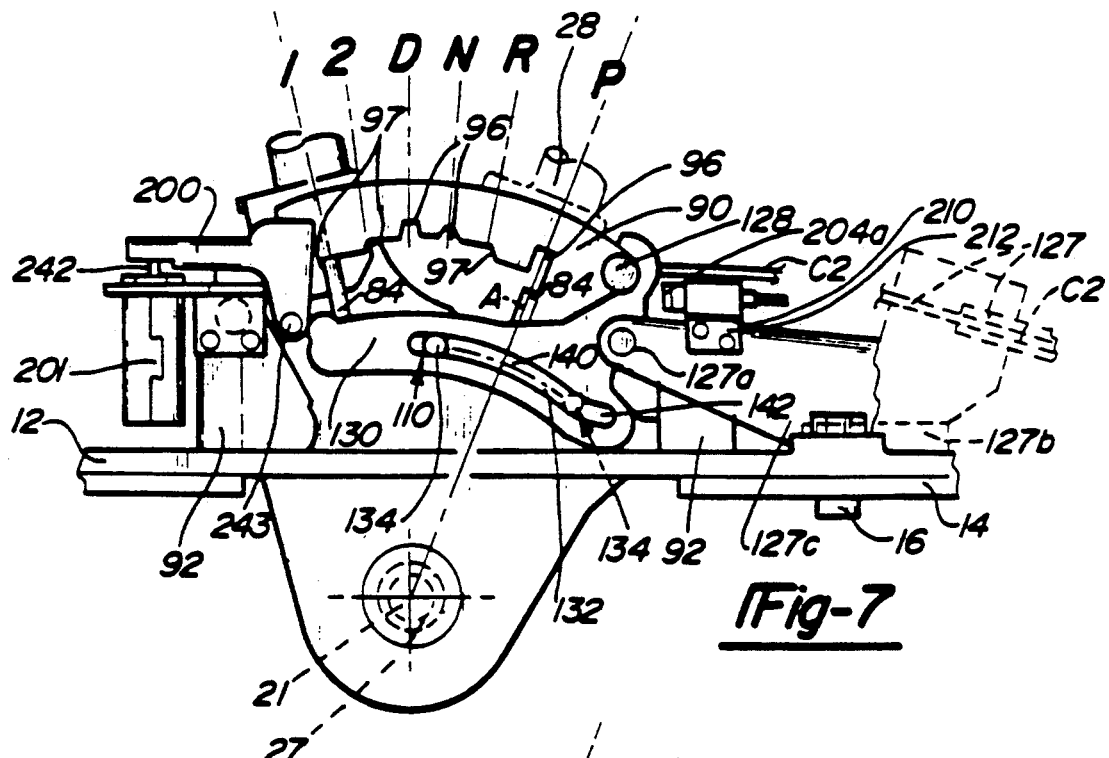
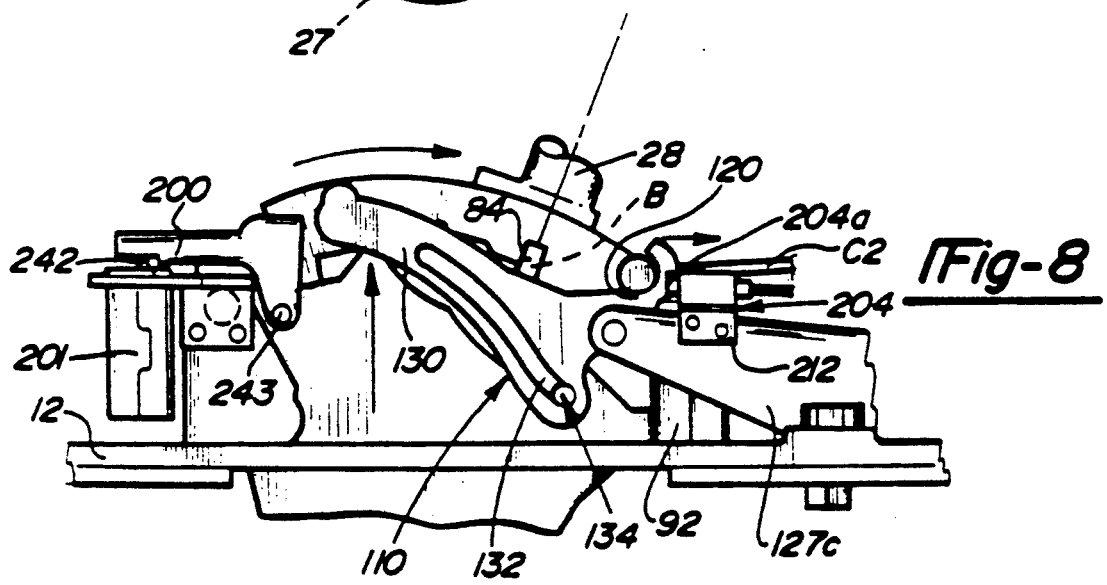
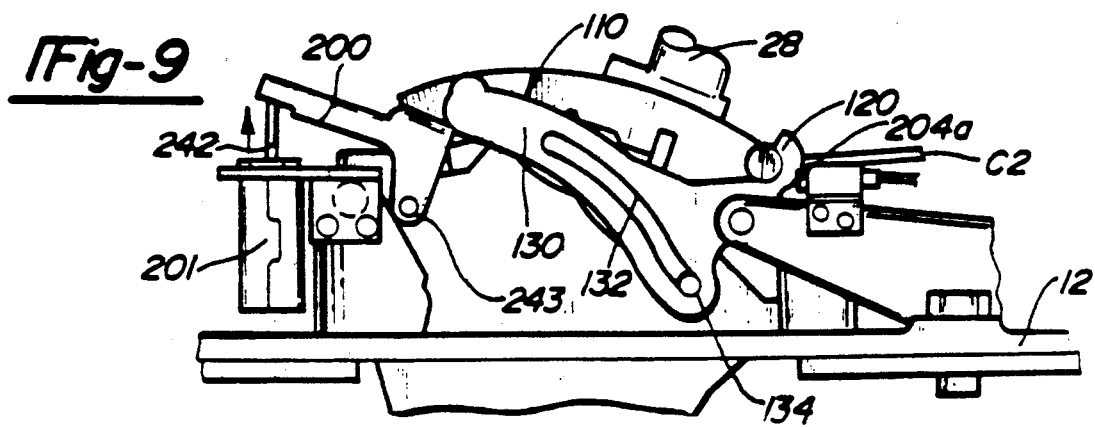

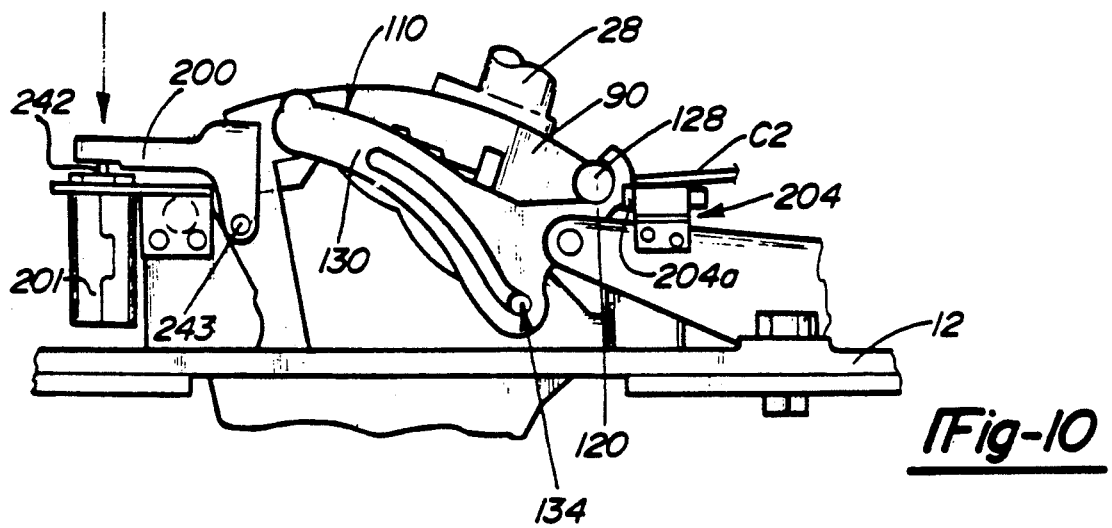
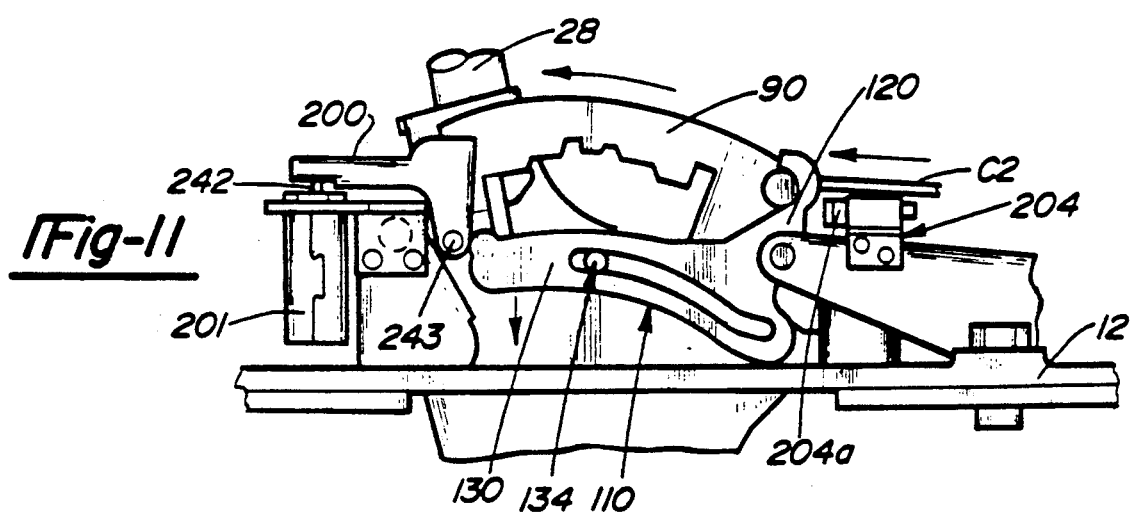
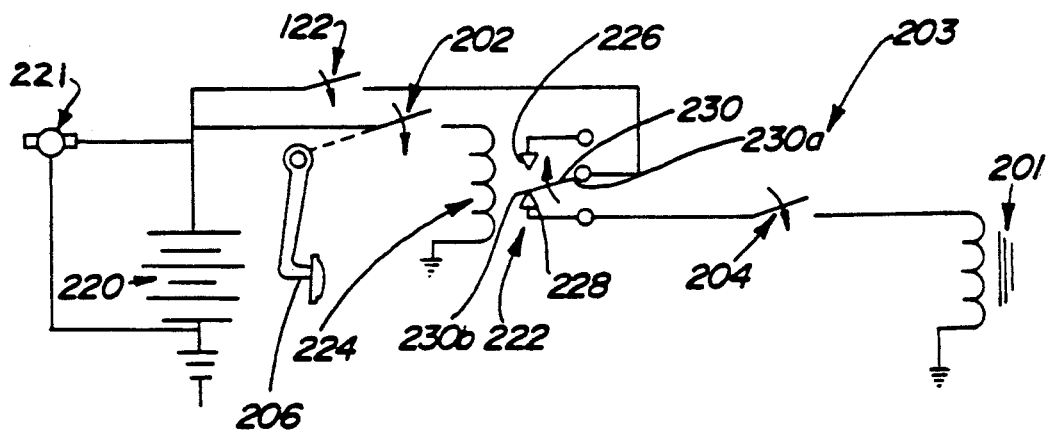

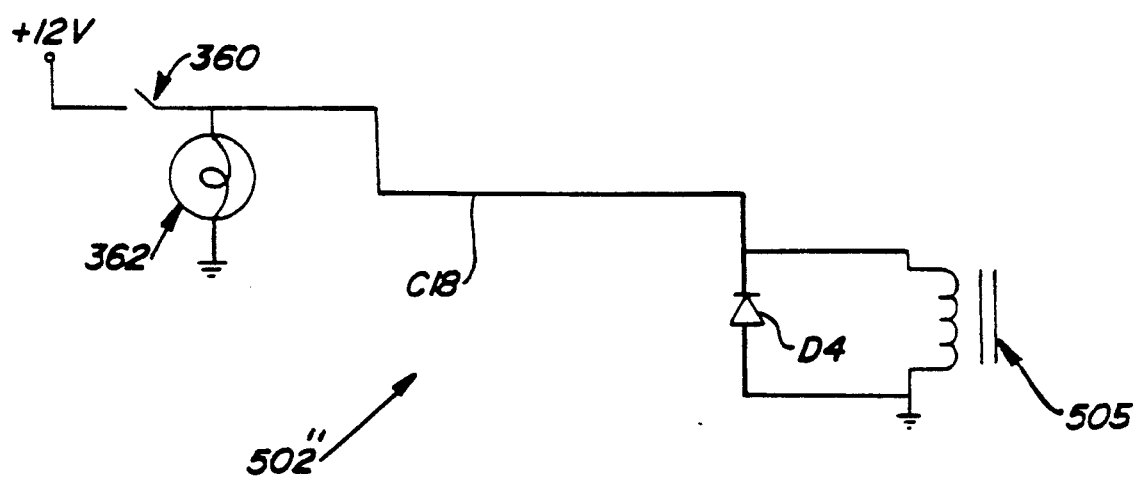
[Fig-21]

SERVICE BRAKE AND SHIFT LEVER INTERLOCK SYSTEM

This application is a continuation of U.S. Ser. No. 07/591,605 filed Oct. 2, 1990 which matured into U.S. Pat. No. 5,129,494 granted Jul. 14, 1992 which is a divisional of U.S. Ser. No. 07/314,777 filed Feb. 23, 1989 which matured into U.S. Pat. No. 5,018,610 granted May 28, 1991.

FIELD OF THE INVENTION

This invention relates to a service brake and shift lever interlock system for a vehicle having a transmission shift lever movable between a non-drive position, such as "Park", and one or more drive positions such as "Drive" and "Reverse".

BACKGROUND OF THE INVENTION

An improved vehicle transmission shift control mechanism having an ignition interlock mechanism is described in copending U.S. patent application Ser. No. 137,759 filed Dec. 24, 1987 now U.S. Pat. No. 4,936,158 of common assignee herewith.

The transmission shift control mechanism described in that patent application includes a shift lever pivotal on a support base or frame between a "Park" position and other operative positions such as drive, reverse, neutral, etc. The shift lever is selectively retained in one of these positions by a detent mechanism which releasably couples the shift lever and a detent plate attached on the support base. The detent mechanism is manually released out of coupling relation between the detent plate and shift lever to free the shift lever for repositioning.

A locking mechanism is provided for preventing movement of the shift lever from the "Park" position when the vehicle ignition lock mechanism is actuated to the "Lock" position and for preventing such actuation of the vehicle ignition lock mechanism when the shift lever is in an operative position other than the "Park" position.

The locking mechanism includes a locking lever, such as a bellcrank, pivotally disposed relative to the detent plate. The locking lever is operably connected to the vehicle ignition lock mechanism for pivotal movement to a locking position relative to the detent mechanism to prevent release of the shift lever when the ignition lock mechanism is actuated to the "Lock" position with the shift lever means in the "Park" position.

The locking mechanism also includes a locking member such as an elongate locking pin carried on the shift lever mechanism for movement therewith along the locking lever to a cooperative position when the shift lever is placed in the "Park" position. In the cooperative position, the locking lever can pivot relative to the locking member to the locking position and, upon actuation of the ignition lock mechanism to the "Lock" position, blocks movement of the detent mechanism. The locking member is also movable along the locking lever to a non-cooperative position therewith when the shift lever is in positions other than the "Park" position. In the non-cooperative position, the locking member prevents pivoting of the locking lever to the locking position and thus prevents actuation of the vehicle ignition lock mechanism to the "Lock" position unless the shift lever means is in the "Park" position It is an object of the present invention to provide a service brake and shift lever interlock system for vehicle transmission shift control mechanisms including but not limited to the type described in the aforementioned copending patent application.

It is another object of the present invention to provide a service brake and shift lever interlock system having a control circuit to prevent shifting of the shift lever, unless the shift lever is in a non-drive position, such as the "Park" position, the ignition switch is in the "On" position (i.e., the "Start" or "Run" position) and the service brake system, such as the service brake pedal, is applied to brake the wheels of the vehicle.

It is another object of the present invention to provide such a service brake and shift lever interlock system which frees the shift lever for movement under other conditions.

It is still another object of the present invention to provide an interlock system having a bellcrank or other locking lever cooperable with the ignition switch mechanism to lock the shift lever in the non-drive position when the ignition switch mechanism is placed in the "Lock" position and also to lock the shift lever against movement when the ignition switch mechanism is in the "Start" or "Run" position, the electrical system is energized and the brake pedal is in the brake release position.

SUMMARY OF THE INVENTION

The present invention contemplates a brake and shift lever interlock system for a vehicle having a transmission with a shift lever movable between a drive position (e.g., forward or reverse) and a non-drive position (e.g., "Park"), an engine and a service brake system, such as having a service brake pedal, operable in a brake applied mode and a brake release mode.

The invention contemplates a service brake and shift lever interlock system wherein means responsive to the operational mode of the service brake system is employed t control locking/unlocking of the shift lever in the non-drive position, such as in the "Park" position when the ignition switch is in the "Start" or "Run" position.

The invention also contemplates a service brake and shift lever interlock system wherein a service brake responsive switch means is employed in combination with other switch means, such as the ignition switch and a switch means responsive to the position of the shift lever, to control locking/unlocking of the shift lever in the "Park" position when the ignition switch is in the "Start" or "Run" position.

In a preferred embodiment of the invention, the service brake and shift lever interlock system includes an electrical power source, an electrically actuable locking means for preventing shifting of the shift lever and an electrical logic control circuit having multiple switching means connected in series between the power source and the locking means for actuating the latter only under certain conditions. The logic control circuit includes ignition switch means, first switching means responsive to the position of the shift lever and second switching means responsive to the operational mode of the service brake system; for example, to the brake pedal position or brake fluid pressure. The ignition switch means is placed in a closed (current conducting) condition when the engine is being started or is operating. The first switching means (shift lever responsive) is placed in a current conducting condition when the shift lever is in the non-drive position and in a current non-conducting condition when the shift lever is in the drive position. The second switching means (service brake responsive) is placed in a current conducting condition when the brake pedal is in the brake release position and in a current non-conducting position when the brake pedal is in the brake applied position. The logic control circuit actuates the locking means only when the ignition switch is closed (e.g., positioned at "Start" or "Run" position), the shift lever is in the non-drive position (e.g., the "Park" position) and the brake pedal is in the brake release position. The logic control circuit does not effect actuation under other conditions or positions of these components.

In one particular working embodiment of the invention, the first switching means includes a pair of voltage-controlled solid state switching elements (e.g., field effect transistors) in parallel in an ignition run circuit. The parallel switching elements are alternately controlled between current conducting/non-conducting conditions such that the parallel combination is in a current conducting condition in the event the ignition switch means is in the "Start" or "Run" position when the shift lever is in the non-drive ("Park") position. When the shift lever is in a drive position, both switching elements assume a current non-conducting condition.

The second switching means comprises a voltage-controlled switching element which assumes a current conducting or non-conducting condition in response to respective opening and closing of a mechanical brake pedal switch actuated by movement of the brake pedal.

The electrically actuated locking means includes a bellcrank locking lever operatively connected with the ignition mechanism to lock a shift lever detent means against manual actuation by the operator of the vehicle when the shift lever is in the "Park" position and the ignition switch means is in the "Lock" position; i.e., an open (current non-conducting) position. An electromagnetic actuator such as a solenoid is operatively associated with the bellcrank and is energized to effect locking of the bellcrank in its locking position relative to the detent when the ignition switch means is turned to the "On" position (i.e., the "Start" or "Run" position) and the brake pedal is in the brake release position. This action prevent shifting of the shift lever out of the "Park" position when the ignition switch means is in the "Start" or the "Run" position until the brake pedal is in the brake applied position.

In another preferred embodiment of the invention, the locking lever is movable to a locking position when the shift lever is releasably retained in the "Park" position. When the locking lever is in the locking position and the ignition switch mechanism is in the "Lock" position, the locking lever prevents movement of the shift lever from the "Park" position. A lever locking means, such as a solenoid, is responsive to the operational mode of the service brake system to retain the locking lever in the locking position when the shift lever is in the "Park" position with the ignition switch mechanism in the "Start" or "Run" position and with the service brake in the brake released mode and is responsive to release the bellcrank locking lever when the service brake is subsequently placed in the brake applied mode such that the locking lever is free for movement by manual actuation of the shifter lever detent means to permit the shift lever to be moved from the "Park" position.

BRIEF DESCRIPTION OF THE DRAWINGS

FIG. 1 is a perspective view of a transmission shift control mechanism having a brake and shift lever interlock system in accordance with one embodiment of the invention and includes a diagrammatic representation of a vehicle transmission and vehicle steering column ignition lock mechanism.

FIG. 2 is a plan view of the transmission shift control mechanism of FIG. 1.

FIG. 3 is a view taken along line 3 of FIG. 1.

FIG. 4 is an exploded view of the pawl mechanism of the shift lever.

FIG. 5 is an exploded view of the handle of the shift lever showing the detent actuating shift rod and pushbutton.

FIG. 6 is a view taken along lines 6—6 of FIG. 5.

FIG. 7 is an elevation of the transmission shift control mechanism and the interlock system with the shift lever shown in solid in a drive position and in phantom in the unlocked orientation in the "Park" position.

FIG. 8 is a similar view as FIG. 7 with the shift lever shown in the "Park" position with the ignition key "Off" and the brake pedal in the brake release position.

FIG. 9 is similar to FIG. 8 with the shift lever shown in the "Park" position with the ignition key "On" and the brake pedal in the brake release position.

FIG. 10 is similar to FIG. 8 with the shift lever shown in the "Park" position with the ignition key "On" and the brake pedal in the brake applied position.

FIG. 11 is similar to FIG. 8 with the shift lever in a drive position with the ignition key "On" and the brake pedal in the brake applied position.

FIG. 12 is a schematic wiring diagram of the logic control circuit for one embodiment of the invention shown in FIG. 1.

FIGS. 20 and 21 are schematic wiring diagrams of other different control circuits for use with the shifter control mechanism of FIGS. 13-18.

DETAILED DESCRIPTION OF THE INVENTION

Figure 13:
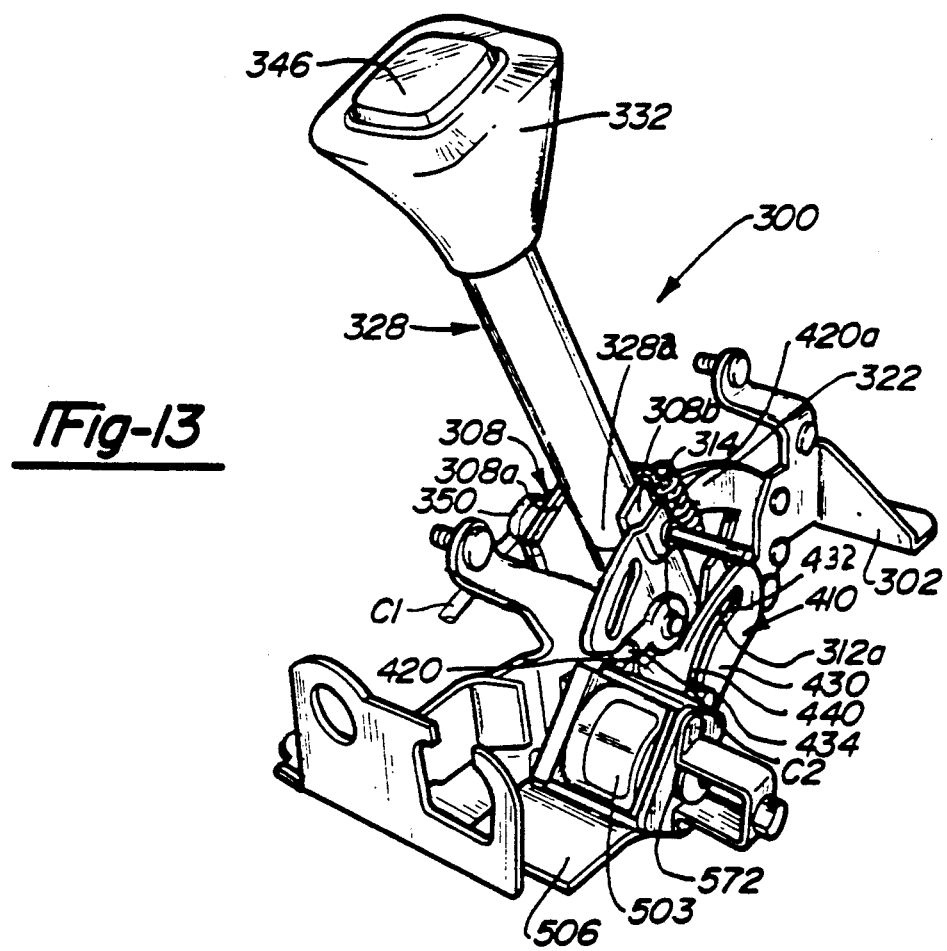
FIG. 13 is perspective view of a transmission shift control mechanism having a brake and shift lever interlock system in accordance with another embodiment of the invention.

Referring to FIGS. 1-12, a transmission shift control mechanism 10 is shown including a support base or frame 12 adapted to be secured to a vehicle body member such as a floor pan member 14, FIG. 7, by a plurality of fasteners 16 (only one shown) extending through holes 18 in the base 12.

The base or frame includes a well 20 having a stationary pivot shaft 21 mounted therein. Shaft 21 is held fixed in well 20 by enlarged head 21a on one shaft end and a retaining ring (not shown) on the opposite shaft end. An inverted U-shaped shift lever carrier frame or member 26 includes spaced apart depending side walls 26a,26b pivotably mounted on the shaft 21 by bushings 27. Depending side walls 26a,26b are connected by lateral wall 26c and depending rear wall 26e. Lateral wall 26c of carrier member 26 has attached thereto as by welding a hollow upstanding shift lever 28. Carrier member 26 includes a bottom flange 26d extending from rear wall 26e and to which the lower end of shift lever 28 is attached as by welding.

Received for sliding movement in the shift lever 28 is an actuator rod 30, FIGS. 3 and 5. The actuator rod extends into handle 32 where nose 30a of the actuator rod is positioned in a recess 42a in a pushbutton shaft 42 slidably received in the handle for movement perpendicular to the rod 30. Handle 32 includes a recess 32a receiving a flange 33 on shift lever 28 in snap-fit engagement to retain the handle thereon.

Recess 42a includes cam surface 44 that forces the actuator rod downwardly in the shift lever when the pushbutton 46 is pressed toward the handle by the driver. A coil return spring 50 is disposed around pushbutton shaft 42 and biases the pushbutton and pushbutton shaft away from the handle in known fashion when manual pressure on the pushbutton is released.

As best seen in FIG. 3, the opposite end of actuator rod 30 includes a depending nose 52 that engages spring biased pawl member or detent engaging member 54 pivotably mounted between side walls 26a,26b on carrier member 26. In particular, pawl member 54 includes slotted end 56 pivotably mounted in a slot 57 in side wall 26b.

A spacer 60 is provided and has a cylindrical hub 64 on which a coil spring 68 is received and positioned. Spacer 60 is attached in a slot 63 in side wall 26b. One end 70 of the coil spring abuts against the carrier member, FIG. 3, and the other end 72 engages the pawl member 54 to bias it upwardly. As shown in FIG. 3, the pawl member extends through a cross-slot 76 in the shift lever and extends under the actuator rod. End 80 of the pawl member extends through a slot 82 in side wall 26a of carrier member 26 and terminates in pawl 84.

Pawl 84 is adapted to releasably couple the shift lever, which includes shift lever carrier member 26, to a detent plate 90 fastened in stationary position on support base 12 as shown best in FIGS. 1 and 7. In particular, detent plate 90 is secured to upstanding posts 92 on the support base by fasteners such as rivets (not shown).

Detent plate 90 includes a plurality of notches or slots 96 into which pawl 84 can be releasably coupled or engaged to place and retain the shift lever in the "Park" position P, neutral position N, and drive position D, and further includes stop surfaces 97 for positioning and retaining pawl 84 in a reverse position R and drive two position D2 and drive one position D1 in known manner.

To reposition the shift lever, the driver depresses pushbutton 46 toward handle 32 and pivots the shift lever to the desired operative position P, R, N, D, 2, 1. Depressing the pushbutton causes actuator rod 30 to release or decouple pawl 84 downwardly out of engagement with the detent plate 90. When the shift lever is in the desired operative position, the driver releases the pushbutton and spring 68 biases the pawl upwardly against and coupling with the detent plate to retain the shift lever at the selected operative position P, R, N, D, 2, or 1.

The manually operable detent means thus includes the spring biased pawl, detent plate and actuator rod and associated components in the shift lever.

During such pivotable movement of shift lever 28, a stud 100 affixed on carrier member 26 actuates a known push-pull cable C1 extending to a conventional shifter valve 102 on automatic transmission 104 to place the transmission in the desired operational mode corresponding to the shift lever position P, R, N, D, 2, or 1. Stud 100 pivots with carrier member 26 since both are connected to the shift lever. Cable C1 is attached to stud 100 and passes through fitting 103 attached on extension 105 of base frame 12.

Pivotally mounted on detent plate 90 is a locking lever in the form of bellcrank 110. Bellcrank 110 is pivotably mounted on pivot shaft 112 affixed at one end to detent plate 90. A retaining ring 114 is mounted on the outbound end of pivot shaft 112.

Those skilled in the art will appreciate that bellcrank 110 can be pivotably mounted side-by-side adjacent detent plate 90 from other portions of base frame 12. The invention is not limited to mounting bellcrank 110 on the detent plate, although this is preferred to eliminate tolerances associated with other portions of the base frame; e.g., riveting, welding and other tolerances associated with fabricating the base frame.

Bellcrank 110 includes a first arm 120 operably connected to a push-pull lock cable C2 extending to ignition switch mechanism 122 on the vehicle steering column 124. Cable C2 extends through a slot 126 in arm 120 and is fastened to short rod 128 (or other suitably shaped member) held in the cradle formed by curvilinear arm 120 The outer conduit 127 of push-pull cable C2 includes an integral elongated end or arm 127c extending to pivot 112 and having gage hole 127a receiving pivot 112 in a preferred embodiment. The base 127b of the integral end is fastened to support base 12. Short rod 128 is preset during manufacturing with gage hole 127a to control tolerance stack-up within the cable assembly. The invention is not limited to mounting the outer cable conduit on pivot 112, however.

The axis of pivot 112 on detent plate 90 is used as the primary gage or reference point relative to which significant dimensions of such components of the transmission shift control mechanism as the ignition switch mechanism (including cable C2), locking mechanism (locking lever 110 and locking member 134), shift lever mechanism (shift lever 28 and carrier member 26 and profile of slots 96 and stop surfaces 97 on the detent cam plate 92) are taken. Use of the pivot axis as the gage or reference point for dimensioning these other components together with the geometry of the locking lever and beneficial stacking of tolerances for these components substantially eliminates any need for adjustment of the components of the shift control mechanism 10 after assembly in the vehicle with the ignition switch mechanism 122 on the steering column.

Ignition switch mechanism 122 can be a conventional steering column switching mechanism currently used for automotive vehicles such as for the Ford Escort and Topaz automobiles. As is well known, these mechanisms prevent rotation of the steering wheel and hold the cable C2 of the ignition switch mechanism stationary when actuated to the "Lock" position or mode by turning the ignition key to that position or mode on the steering column. Preferably, the ignition switch mechanism 122 includes a spring (not shown) which maintains a bias on cable C2 tending to rotate bellcrank 110 clockwise in FIG. 1 at all times, all as is well known in the art.

Bellcrank 110 also includes a elongate second locking arm 130 extending side-by-side adjacent detent plate 90. Second arm 130 includes a specially configured cam slot 132 adapted to receive a locking member in the form of elongate locking cam pin 134 extending from carrier member 26. Locking cam pin or member 134 has an inboard end 136 affixed on side wall 26a of the carrier plate and an outboard end 138 that is received and rides in cam slot 132. Locking pin or member 134 moves in an arcuate (circular arc) path since it is attached to the carrier member for movement therewith about the pivot axis defined by shaft 21.

Cam slot 132 includes a first circular arc portion 140 and a second circular arc portion 142. The center of circular arc portion 140 corresponds to pivot axis of shift lever 28 on shaft 21 whereas the center of circular arc portion 142 is on the opposite side of the bellcrank and corresponds to the pivot axis of the bellcrank 110.

Those skilled in the art will appreciate that portion 142 of cam slot 132 may have a configuration other than a circular arc so long as the locking lever can pivot past locking pin 134.

In operation when shift lever 28 is moved among operative positions R, N, D, 2 and 1 with the ignition switch mechanism unlocked and pawl 84 depressed out of engagement with the detent plate 90, locking pin or member 134 will move in a circular arc path in first circular arc portion 140 of the bellcrank slot. Bellcrank 110 thus will not be pivoted substantially by the locking cam pin 134 during such movement. The position of pin 134 in cam slot 132 when shift lever 28 is in a drive position is shown in FIG. 1.

Movement of the shift lever 28 from the drive position D (or other operative positions) toward the "Park" position P causes locking pin 134 to travel forward in cam slot 132 to the position shown in phantom in FIG. 7. Locking pin 134 is placed in proximity to the juncture of the first circular arc portion 140 and second circular arc portion 142 when the shift lever is positioned at the "Park" position.

Pawl 84 is shown in FIG. 7 in the depressed position A just after movement of the shift lever to the "Park" position. Pawl 84 is shown in FIG. 8 in the releasably coupled or engaged position B with the detent plate 90 after pushbutton 46 is released by the driver.

Once the driver releases the pushbutton, spring biased cable C2 will pull on arm 120 to pivot bellcrank 110 from the position shown in FIG. 7 to the raised locking position shown in FIG. 8 where elongate arm 130 is in blocking or locking relation to pawl 84 disposed in the "Park" slot in the detent plate 90.

Since lock cable C2 is held stationary and maintains a pull on arm 120 as long as the ignition switch mechanism is actuated to the "Lock" position, bellcrank 110 is held in the pivoted position (locking position) of FIG. 8 with elongate arm 130 preventing movement of pawl 84 from the "Park" slot on the detent plate by the driver's depressing pushbutton 46. Thus, in the pivoted locking position, locking arm 130 prevents the driver from moving the shift lever 28 from the "Park" position when the ignition switch mechanism is actuated to the "Lock" position as mentioned above.

During pivoting of bellcrank 11? to the locking position of FIG. 8, locking pin 134 remains stationary while arm 130 moves therepast in cooperative manner. Second circular arc portion 142 is configured to cooperate with pin 134 to allow such pivoting of the bellcrank relative to locking pin 134. Thus, locking pin 134 and bellcrank 110 are in cooperative position when the locking pin is received in the second circular arc portion 142; i.e., when the shift lever is in the "Park" position.

In accordance with the invention, a service brake and shift lever interlock system is also provided. As is well known, the service brake system includes the usual brake pedal and fluid brake pressure system employed to brake the wheels during driving of a vehicle. The parking brake is not considered part of the service brake system. The service brake and shift lever interlock system of the invention includes a pivotal retaining lever 200, solenoid 201 and an electrical logic control circuit 203 shown diagrammatically in FIG. 12 which includes and takes as inputs electrical signals from a brake pedal switch 202 the ignition switch mechanism 122 and shift lever "Park" position indicator switch 204.

The brake pedal switch 202 is mounted on the firewall (not shown) in usual fashion for actuation by movement of the typical service brake pedal 206; i.e., that is movable between a brake release position where the vehicle wheels are not braked and a brake applied (depressed) position when the vehicle wheels are braked. Usually, the brake pedal switch 202 comprises a mechanical switching element that, when closed (current conducting) as a result of the brake pedal being in the brake applied position, energizes a conventional brake light circuit to effect lighting of the rear brake lights of the vehicle. When the brake pedal is in the brake release position, the switch 202 is open (current non-conducting) and the brake lights are not energized in accordance with conventional practice.

The shift lever "Park" position indicator switch 204 is shown in FIGS. 7-11 as fixedly mounted by flange 210 on a support member 212. Support member 212 is fixedly mounted on the arm 127c of the outer conduit 127 of cable C2. The indicator switch 204 is mounted in such a manner as to position the switch arm 204a in the path of the first arm 120 of the bellcrank 110 for actuation by bellcrank movement as will be explained hereinbelow. However, the indicator switch 204 can be mounted anywhere around the perimeter of the bellcrank 110 or the shift lever carrier member 26 or shift lever 28.

The logic control circuit 203 is shown in FIG. 12 and includes an electrical power supply means, such as including the vehicle 12 volt D.C. battery 220 and the alternator (generator) system 221 for providing electrical power in known fashion when the engine is running. The brake pedal switch 202 and the ignition switch mechanism 122 are disposed in the circuit 203 such that the switches 122,202 are both connected to the power supply means 220. The ignition switch 122 is shown in simplified form as either in the "Off" or "On" positions. Those skilled in the art will appreciate the ignition switch mechanism includes other positions such as the "Lock" position referred to above as well as "Start" and "Run" positions, e.g., see FIG. 19.

The brake pedal switch 202 controls a normally closed brake relay 222 having a coil 224 connected to ground, a pair of spaced contacts 226,228 and switch member 230 movable between the contacts 226, 228. The switch member 230 has one end 230a connected in series with the ignition switch mechanism 122 and another end 230b that is normally closed against contact 228 when the coil 224 is de-engerized as a result of the brake pedal switch 202 being open (i.e., as a result of the brake pedal being in the brake release position). The switch member 230 of the relay is normally closed against contact 228 by the usual spring bias. The other end 230b of switch member 230 engages contact 226 when the coil 224 is energized by the power source 220 as a result of the brake pedal switch 202 being closed (current conducting) when the brake pedal is in the brake applied position. Thus, when the brake pedal is in the brake applied position, the relay 222 is energized by power source 220 to an open position to remove power from components of the circuit 203 downstream of the ignition switch mechanism 122.

The circuit 203 includes the shift lever "Park" position indicator switch 204 and an electrical "push" type solenoid 201 in series downstream of the ignition switch mechanism 122 and the relay 222 (i.e., switch contact 228 and switch member 230) as shown in FIG. 12. The solenoid 201 comprises a conventional 12 volt D.C. "push" type solenoid (e.g., model 189724-034 available from Ledex, Inc.) connected to ground. This particular solenoid 201 includes a push rod 242 normally spring biased to a retracted position as shown in FIGS. 7–8 and 10–11. When the solenoid 201 is energized, the push rod 242 is extended as shown in FIG. 9.

As shown in FIGS. 7–11, the push rod 242 pivots the retaining lever 200 referred to hereinabove about a pivot pin 243 fastened on detent plate 90. The retaining lever 200 is pivoted between a release position shown in FIGS. 7–8 and 10–11 when the push rod 242 is in the retracted position and an angularly displaced retaining position shown in FIG. 9. In the retaining position, the retaining lever 200 is pivoted clockwise from the release position into a blocking position beneath the second locking arm 130 of the bellcrank 110 when the bellcrank is in the raised locking position relative to the pawl 84 as described hereinabove.

FIGS. 7–11 illustrate various operational modes of the brake and shift lever interlock system described hereinabove. These operational modes are summarized herebelow in the Table:

TABLE

| | | |
|---|---|---|
| FIG. 7 | Key: | On |
| | Brake: | Off |
| | Shifter Position: | Drive (D, 1 or 2) |
| | Park Position Switch: | Off |
| | Key Interlock: | Released |
| | Brake Interlock: | Off |
| FIG. 8 | Key: | Off |
| | Brake: | Off |
| | Shifter Position: | Park |
| | Park Position Switch: | On |
| | Key Interlock: | Locked |
| | Brake Interlock: | Off |
| FIG. 9 | Key: | On |
| | Brake: | Off |
| | Shifter Position: | Park |
| | Park Position Switch: | On |
| | Key Interlock: | Released |
| | Brake Interlock: | Energized |
| FIG. 10 | Key: | On |
| | Brake: | On |
| | Shifter Position: | Park |
| | Park Position Switch: | On |
| | Key Interlock: | Released |
| | Brake Interlock: | Off |
| FIG. 11 | Key: | On |

TABLE-continued

| | | |
|---|---|---|
| | Brake: | On |
| | Shifter Position: | Drive (D, 1 or 2) |
| | Park Position Switch: | Off |
| | Key Interlock: | Released |
| | Brake Interlock: | Off |
| FIG. 7 | Key: | On DEAD BATTERY |
| | Brake: | Off |
| | Shifter Position: | Drive (D, 1 or 2) |
| | Park Position Switch: | Off |
| | Key Interlock: | Released |
| | Brake Interlock: | Off |
| FIG. 8 | Key: | On DEAD BATTERY |
| | Brake: | Off |
| | Shifter Position: | Park |
| | Park Position Switch: | On |
| | Key Interlock: | Released |
| | Brake Interlock: | Off |

When the ignition switch mechanism 122 is in the "Lock" position with the shift lever in the "Park" position, no power is available to the service brake and shift lever interlock system from power source 220 such that the solenoid 201 is not energized regardless of the position of the brake pedal switch 202 and the indicator switch 204. However, the shift lever 28 cannot be moved from the Park" position to a drive position as a result of the bellcrank 110 being in the locking position, FIG. 8, where the locking arm 130 blocks movement of the pawl 84 as explained hereinabove.

When the ignition switch mechanism 122 is placed in the "On" position (either the "Start" position or the "Run" position) but the power source 220 is not effective to provide power (e.g., the battery is dead), no power is available to the brake and shift lever interlock system and the solenoid 201 is not energized regardless of the position of the brake pedal switch 202 and the indicator switch 204, FIG. 7 and 8.

When the ignition switch mechanism 122 is in the "On" position ("Start" or "Run" position) and the power source 220 is operative to provide power (e.g., the battery is charged), the brake and shift lever interlock system is operable to energize the solenoid 201 to move the retaining lever 200 into blocking relation beneath the bellcrank 110 as shown in FIG. 9 when the brake pedal is in the brake release position. The retaining lever 200 prevents or blocks movement of the bellcrank 110 when the ignition switch mechanism is in the "On" position and the brake pedal is not actuated to brake the vehicle wheels. As a result, the driver cannot move the shift lever 28 from the "Park" position even when the ignition switch mechanism 122 is in the "On" position so long as the brake pedal is in the brake release position (i.e., the brake pedal is not depressed).

In order to move the shift lever 28 from the "Park" position to a drive position with the ignition in the "On" position, the driver must move (depress) the brake pedal to the brake applied position to cause relay 222 to open and remove power from the solenoid 201, thus moving (pivoting) by gravity or by an optional return spring the retaining lever 200 to the retracted position shown in FIG. 11 out of the way of the bellcrank 110.

When the retaining lever 200 is pivoted to the retracted position, FIG. 11, with the ignition switch mechanism 122 in the "On" position, the lock cable C2 is permitted to slidably extend to the left (in FIG. 11) to allow counterclockwise pivoting of the bellcrank 110 about its pivot 112 to the lower position shown in FIG. 11. Locking pin 134 will still remain stationary and the second locking arm 130 can pivot as permitted by the circular arc portion 142 as a result of the pawl 84 pushing down on the locking arm 130 when the driver depresses pushbutton 46.

The shift lever 28 can then be moved to one of the other operative shift lever positions R, N, D, 1 or 2. Locking pin 134 will move with the shift lever carrier member 26 in a circular arc path in the first circular arc portion 140 of cam slot 132 as the shift lever 28 is so moved.

During operation with the shift lever in a position other than the "Park" position e.g., FIGS. 7 and 11, the locking pin 134 and first circular arc portion 140 of cam slot 132 are non-cooperatively positioned to prevent pivoting of the bellcrank 110 in response to attempted actuation of the ignition switch mechanism to the "Lock" position by the driver. Locking pin 134 is held fixed by pawl 84 coupling carrier member 26 to the detent plate 90 so that arm 130 cannot move substantially if the driver attempts to lock the ignition lock mechanism. Thus, bellcrank 110 and locking pin 134 prevent actuation of the ignition lock mechanism to the "Lock" position when the shift lever 28 is in a position other than the "Park" position.

Moreover, when the shift lever 28 is in a position other than the "Park" position, e.g., R, N, D, 1 or 2, the brake and shift lever interlock system is not actuated (i.e., solenoid 201 is not energized) by circuit 203 as a result of the shift lever "Park" position indicator switch 204 being in the open (current non-conducting) condition.

Thus, the service brake and shift lever interlock system is actuated only when the ignition switch mechanism 122 is in the "On" position ("Start" or "Run" position), the shift lever 28 is in the "Park" position and the brake pedal is in the brake release position (vehicle brakes not applied). For other input sequences (see the aforementioned Table), the service brake and shift lever interlock system is not actuated (i.e., solenoid 201 is not energized).

The invention thus provides an interlock system for a vehicle wherein the shift lever 28 is prevented from movement from the "Park" position when the ignition switch mechanism 122 is in the "Lock" position regardless of the position of the brake pedal and also when the ignition switch mechanism 122 is in the "On" position ("Start" or "Run" position) and the brake pedal is in the brake release position (i.e., brakes not applied). When the shift lever 28 is in a position other than the "Park" position, the interlock system does not interfere with movement of the shift lever 28 among the various operative positions (P, R, N, D, 1 or 2). However, the interlock system does prevent actuation of the ignition switch mechanism to the "Lock" position unless the shift lever is in the "Park" position.

FIGS. 13–19 illustrate a second embodiment of a transmission shift control mechanism 300 of the invention. The transmission shift control mechanism includes a support base or frame 302 adapted to be secured to a vehicle body member 304 by a plurality of fasteners 305 (two shown) extending through holes in the support base. An inverted U-shaped shift lever carrier or member 308 is pivotally mounted on the support base 302 by means of pivot shaft 310. In particular, the shift lever carrier 308 includes spaced apart depending side walls 308a, 308b that straddle the support base 302 and are pivotably mounted on stationary pivot shaft 310. The hollow shift lever 328 includes a lower end 328a welded to the carrier 308.

Figure 14:
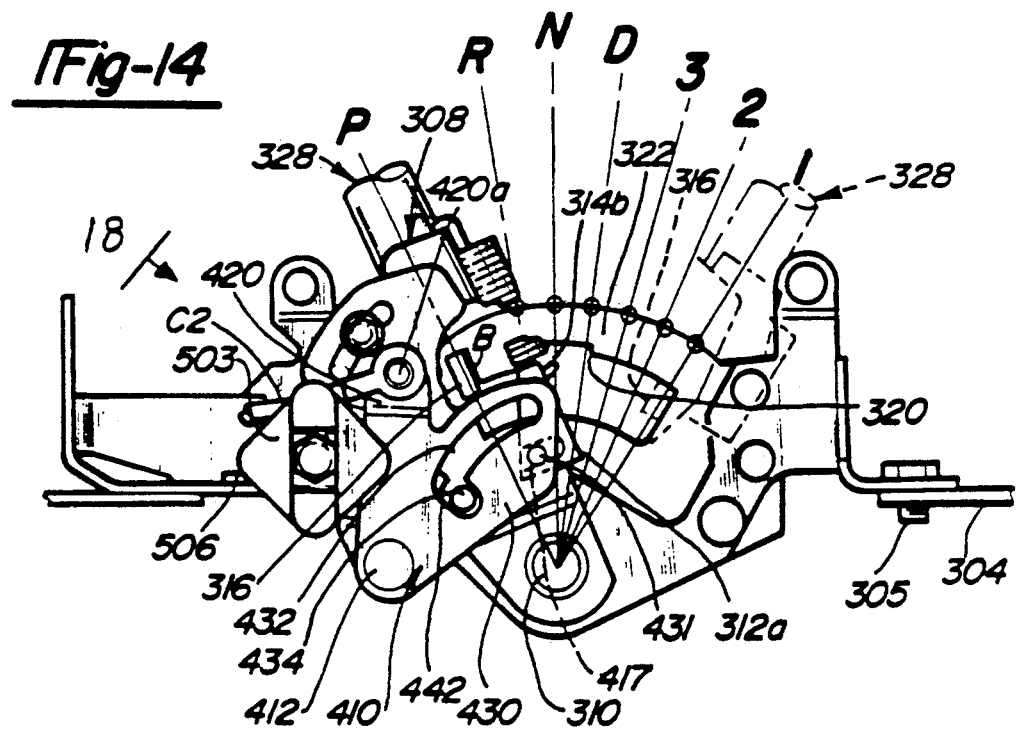
FIG. 14 is a side elevation of the transmission shift control mechanism showing the shift lever in the "Park" position with the bellcrank in locking position relative to a pawl of the shift lever mechanism.
Figure 15:
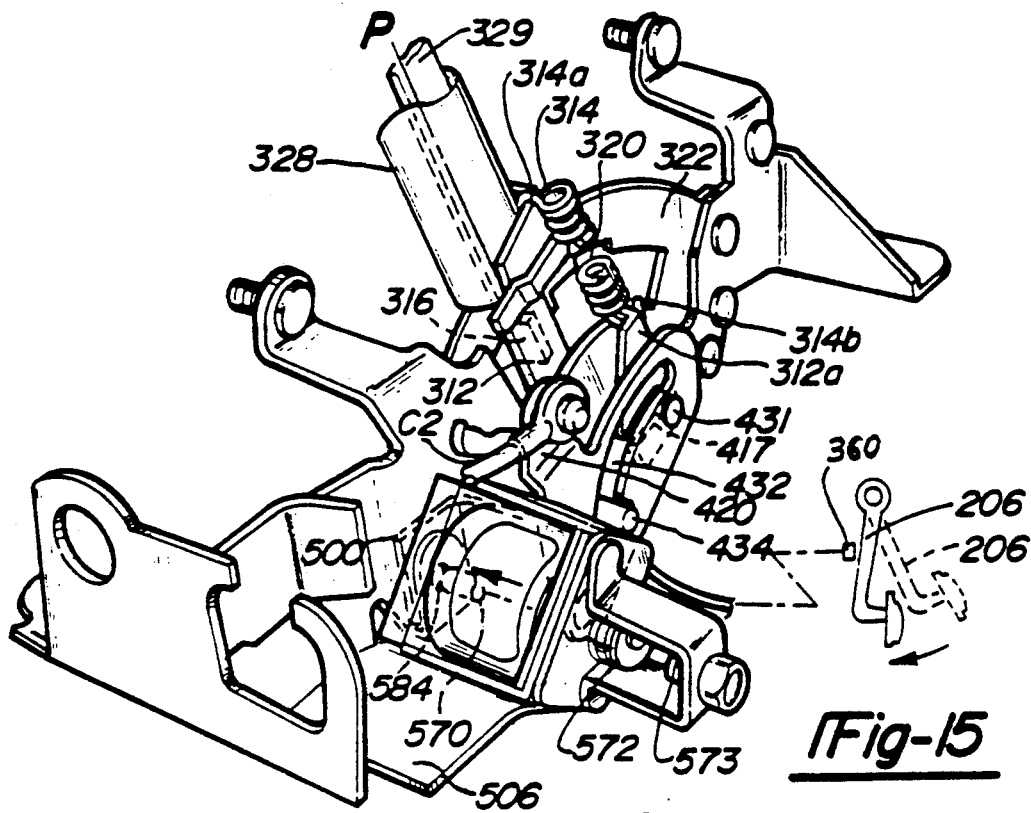
FIG. 15 is a perspective view of the transmission shift control mechanism showing the shift lever in "Park" and the push rod of the energized solenoid in position to lock the bellcrank when the pushbutton of the shift lever is released.

Referring to FIG. 15, received for sliding up and down movement in the hollow shift lever 32 is an actuator member 329 having formed on its lower end a pawl member 312. The actuator rod and the pawl member 312 are biased upwardly in FIGS. 13–16 by a coil spring 314 having an upper end 314a hooked on the carrier 308 and lower end 314b hooked on a lower U-shaped extension 312a of the pawl member 312. The pawl member 312 is moved up or down against the bias of the spring 314 by a manually operable pushbutton mechanism 346 on the handle 332 of the shift lever 32 in known fashion.

The pawl member 312 includes a pawl 316 projecting perpendicularly to a detent cam plate 322 fastened to the support base 302 and adapted to engage a plurality of notches or stops 320 in the detent cam plate 322 to releasably couple and retain the shift lever 328 in the "Park" position, neutral position N, drive positions D, 1, 2, 3 and reverse position R.

The shift lever 328 is moved among the non-drive positions (e.g., "Park" or "Neutral" positions) and the drive positions by the driver depressing the pushbutton 346 on the shift lever handle to move the pawl member 312 downwardly against the bias of coil spring 314 to disengage the pawl 316 from the notches/stop 320. The shift lever is then pivoted to the desired position and the pushbutton on the shift lever handle is released to allow coil spring 314 to move the pawl 316 upwardly against the desired notch/stop 320 on the detent ca plate 322.

During such pivotable movement of the shift lever 328, a stud 350 (FIG. 13) affixed on the carrier member 308 actuates a known push-pull cable C1 extending to a conventional shifter valve (not shown) to place the transmission in the desired operational mode, e.g., as illustrated in FIG. 1. Stud 350 pivots with carrier member 308 since both are connected to the shift lever 328.

Pivotally mounted on the support base 302 is a locking lever in the form of a bellcrank 410. Bellcrank 410 is pivotally mounted on pivot shaft 412 affixed on the support base. The bellcrank 410 is provided for the same purpose as bellcrank 110 of the embodiment of FIGS. 1–12.

The bellcrank 410 includes a first arm 420 with a fitting 420a operably connected to a push-pull cable C2 extending to the ignition switch mechanism of the vehicle described hereinabove for preventing rotation of the steering wheel and holding the cable C2 stationary when actuated to the "Lock" position by turning the ignition key.

Bellcrank 410 also includes an elongate second locking arm 430 having a cam slot 432 adapted to receive a locking member in the form of an elongate locking cam pin 434 having an inner end (not shown) attached on the carrier member 308 and an outer end received in the cam slot 432 in a manner ( similar to pin 138 of FIGS. 1–12.

Cam slot 432 includes a circular arc portion 440 and a transverse linear portion 442 that correspond in function to cam slot portions 140,142 described hereabove.

The inner side of the second locking arm 430 includes a coupling pin 431 extending perpendicular to a coupling slot 417 in the pawl extension 312a. The coupling slot 417 and the coupling pin 431 are relatively movable during operation of the shift control mechanism, FIG. 15.

Figure 16:
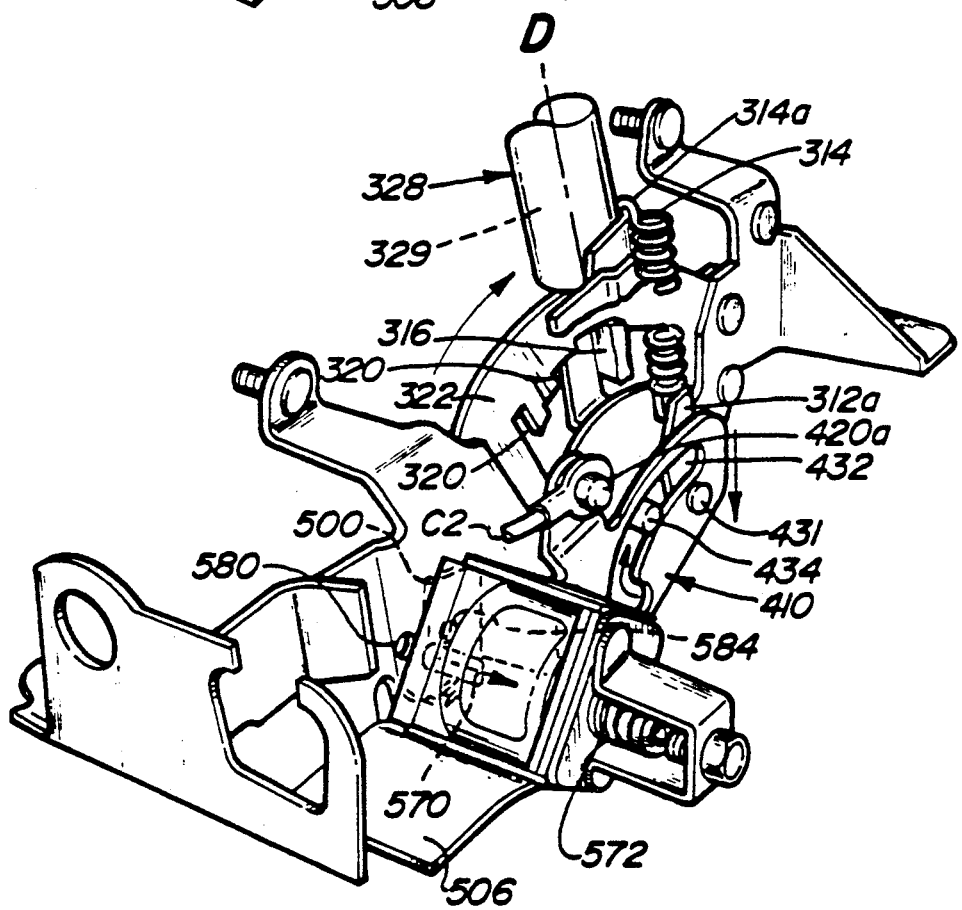
FIG. 16 is similar to FIG. 15 with the push rod retracted to free the bellcrank to allow the shift lever to be moved out of the "Park" position.
Figure 17:
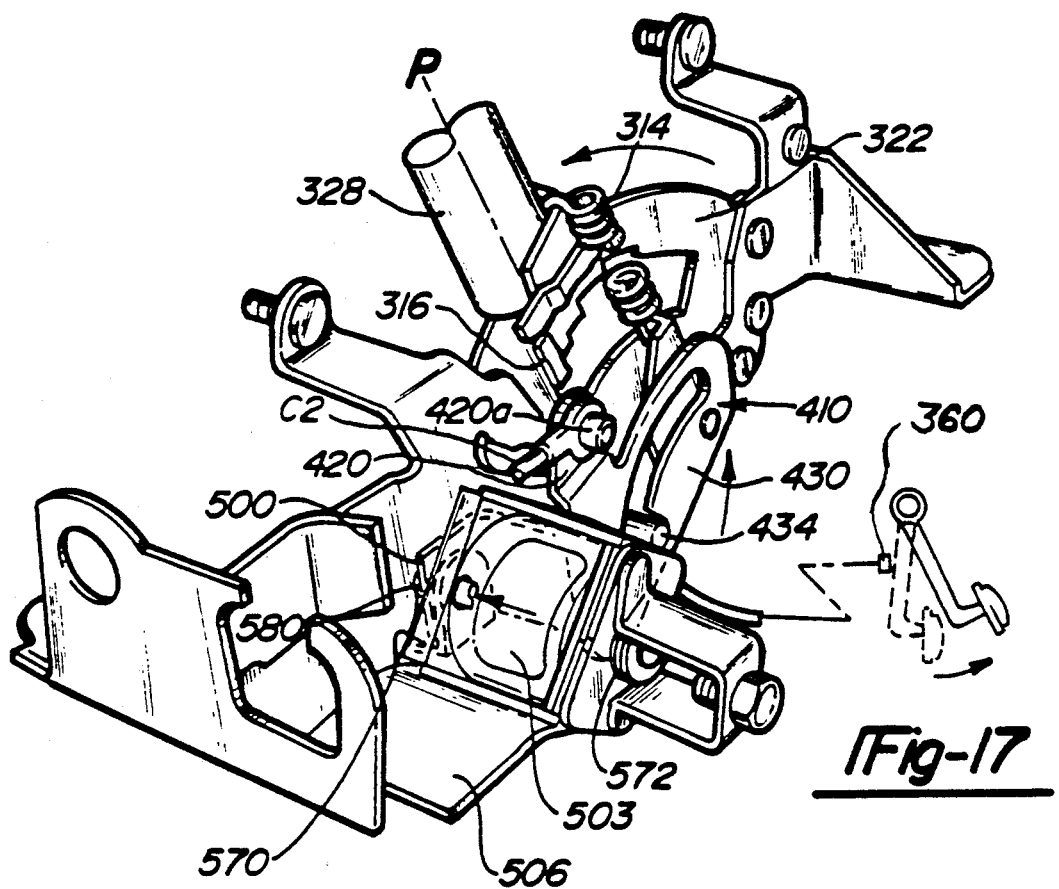
FIG. 17 is similar to FIG. 15 with push rod actuated to lock the bellcrank and thus the shift lever in the "Park" position.

In operation when shift lever 328 is moved among operative positions R, N, D, 3, 2 and 1 with the ignition switch mechanism unlocked and pawl 316 depressed out of engagement with the detent plate 322, the locking pin or member 434 will move in a circular arc path in first circular arc portion 440 of the bellcrank slot. Bellcrank 410 thus will not be pivoted substantially by the locking cam pin 434 during such movement. The position of pin 434 in cam slot 432 when shift lever 328 is in different drive positions is shown in FIGS. 15-16. At the same time, the coupling pin 431 of the bellcrank is not received in the coupling slot 417 of the pawl member 312 when the shift lever 328 is in the positions R, D, 3, 2, 1 and N, whether the pushbutton 346 is depressed or released.

Movement of the shift lever 328 from the drive position D (or other operative positions) toward the "Park" position P causes locking pin 434 to travel forward in cam slot 432 to the position shown in FIG. 14 and also causes the slot 417 of extension 312a to move toward the locking pin 431 such that the pin 431 is received therein. The locking pin 434 is placed in proximity to the juncture of the first circular arc portion 440 and linear portion 442 when the shift lever is positioned at the "Park" position.

Pawl 316 is shown in FIG. 14 in the releasably coupled or engaged position B with the detent plate 322 after the pushbutton on the shift lever handle is released by the driver when the shift lever is in the "Park" position and prior to the driver's actuating the ignition switch mechanism to the "Lock" position by rotating the ignition key on the steering column. The bellcrank 410 has been pivoted counterclockwise to the locking position relative to the pawl 316 in contact therewith by the bias of the coil spring 314 as a result of the bias on the cable C2 exerted by the spring biased ignition switch mechanism (e.g., switch mechanism 122 in FIG. 1) and as a result of temporary mechanical coupling between the pawl member 312 and the bellcrank 410, i.e., coupling pin 431 being received temporarily in coupling slot 417 when the shift lever is in the "Park" position. The coupling pin 431 on the bellcrank 410 and the coupling slot 417 on the pawl extension 312a thus constitute means for temporarily coupling the pawl 312 and the bellcrank 410 when the shift lever 328 is in the "Park" position with the pushbutton 346 depressed or released.

Once the driver actuates the ignition switch mechanism to the "Lock" position by turning the ignition key in known fashion, the bellcrank 410 is held in the raised locking position where the elongate locking arm 430 contacts and blocks or locks the pawl 316 in its upper position in the "Park" slot of the detent plate 322.

Since lock cable C2 is held stationary and maintains a pull on arm 320 as long as the ignition switch mechanism is actuated to the "Lock" position, bellcrank 410 is held in the pivoted position (locking position) of FIG. 14 with elongate coupling pin 431 received in the coupling slot 417 of the pawl extension 312a. The locking arm 430 prevents movement of pawl 316 from the "Park" slot on the detent plate by the driver's depressing the pushbutton on the shift lever handle. Thus, in the pivoted locking position, locking arm 430 prevents the driver from moving the shift lever 328 from the "Park" position when the ignition lock mechanism is actuated to the "Lock" position as mentioned above.

During pivoting of bellcrank 41 to the locking position of FIG. 14, locking pin 434 remains stationary while arm 430 moves therepast in cooperative manner. Linear cam slot portion 442 is configured to cooperate with pin 434 to allow such pivoting of the bellcrank in response to release of the pushbutton 346 when the shift lever is positioned in the "Park" position. Thus, locking pin 434 and bellcrank 410 are in cooperative position when the locking pin is received in the linear cam slot portion 442; i.e., when the shift lever is in the "Park" position.

Figure 18:
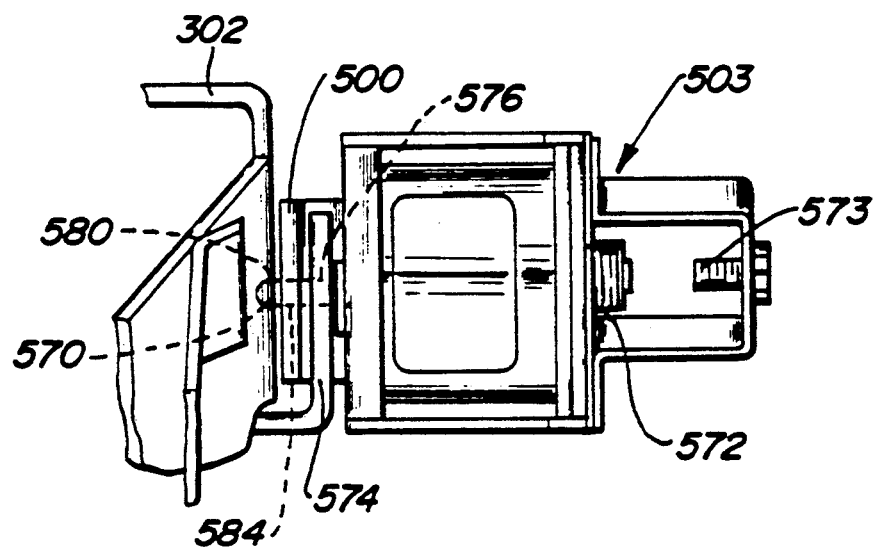
FIG. 18 is an elevational view in the direction of arrow 18 in FIG. 14.
Figure 19:
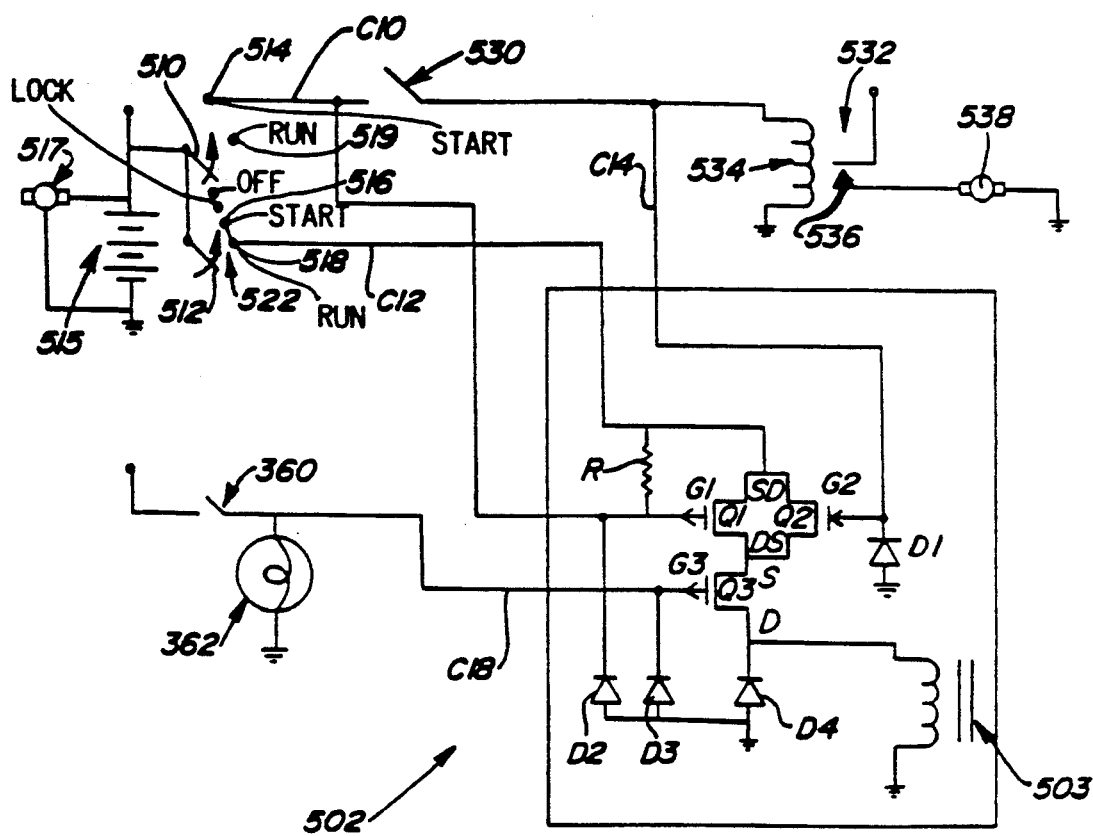
FIG. 19 is a schematic wiring diagram of a preferred logic control circuit for the shift control mechanism shown in FIG. 13.

The embodiment of FIGS. 13-19 includes a service brake and shift lever interlock system comprising a retaining flange 500 fastened or formed integrally on the bellcrank 410 (FIG. 15), an electrical logic control circuit 502 shown diagrammatically in FIG. 19 and a solenoid 503 mounted on the support base 302 by a flange support 506.

The logic control circuit 502 includes the ignition switch mechanism 522 which is a conventional ignition switch mechanism; e.g., as used on the Corvette automobile. The ignition switch mechanism is operable among an "Off" position, a "Lock" position, a "Start" position to start the vehicle engine and a "Run" position to continue operation of the engine after it is started. As shown, the ignition switch mechanism includes a pair of switch members 510, 512. Switch 510 contacts the contact 514 for the ignition start circuit C10 when the ignition key is turned to the "Start" position to energize the start circuit from the electrical power supply (e.g., the vehicle battery 515 and the alternator/generator 517 in known fashion). Switch 512 contacts the contact 516 ("Start" contact) for the ignition run circuit C12. "Start" contact 516 is electrically connected to the "Run" contact 518 to energize the ignition run circuit C12 from the electrical power supply 515 when the ignition switch mechanism is in the "Start" position. As is known, once the engine is started and the ignition key is released, the switch members 510,512 are returned to the "Run" positions (e.g. "Run" contacts 518, 519, respectively) by the usual spring mechanism (not shown).

The ignition start circuit C10 includes in series with the "Start" contact 514 what is known in the art as a neutral safety switch 530. The neutral safety switch 530 is a mechanical switch that is closed (current conducting) when the shift lever is in the "Park" position or "Neutral" position and open (current non-conducting) when the shift lever is in a drive position such as drive D, 1, 2, 3 or reverse R. The safety switch 530 thus prevents starting of the vehicle engine unless the shift lever 328 is in the "Park" or "Neutral" position.

The ignition start circuit C10 also includes the usual starter relay 532 having coil 534 and switch 536 and a starter motor 538 actuated to start the vehicle engine when the ignition switch mechanism is in the "Start" position and the safety switch 530 is closed.

As is apparent in FIG. 19, the ignition run circuit C12 is energized by the electrical power supply 515 (i.e., the vehicle battery or the alternator (generator)) when the ignition switch mechanism is in the "Start" or "Run" positions. The ignition run circuit C12 includes a pair of insulated gate, voltage-controlled switching transistors Q1 and Q2 in parallel with one another and in series collectively with the "Run" contact 518.

Transistor Q1 is rendered current conducting when its gate G1 is at a preselected voltage state relative to source (e.g., less than 2, 5 or other selected threshold voltage) and is rendered current non-conducting when its gate G1 is at a higher voltage state (e.g., greater than the selected threshold voltage). Transistor Q2 is of opposite polarity from transistor Q1 and thus is rendered current conducting when its gate G2 is at a preselected voltage state relative to source (e.g., greater than the threshold voltage) and current non-conducting when its gate G2 is at a low voltage state (e.g., less than the threshold voltage).

Transistors Q1 and Q2 are rendered alternately current conducting depending upon the position of the ignition switch mechanism 522 and the safety switch 530. When the ignition switch mechanism is in the "Run" position and the safety switch 530 is closed, transistor Q1 will be rendered current-conducting while transistor Q2 will be rendered current non-conducting. For example, in this situation, the gate G1 of transistor Q1 is maintained at the low voltage state by the path to ground through the starter circuit (i.e., the safety switch 530 is closed) while the gate G2 of transistor Q2 is maintained at the low voltage state by the starter relay circuit C1 which is connected between the neutral safety switch 530 and the starter relay coil 534 in the ignition start circuit C10 and which is at 0 volts when the ignition switch mechanism 522 is in the "Run" position.

When the ignition switch mechanism is in the "Start" position and the safety switch 530 is closed, transistor Q1 is rendered current non-conducting and transistor Q2 is rendered current conducting. For example, in this situation, the gate G1 of transistor Q1 is at the high voltage state as a result of ignition start circuit C10 which is connected between the "Start" contact 516 and the safety switch 530 and which is at 12 volts when the ignition switch mechanism is in the "Start" position. The gate G2 of transistor Q2 is at 12 volts by coupling to the starter relay circuit C14.

When the ignition switch mechanism is in the "Run" position and the safety switch 530 is open (i.e., the shift lever 328 is in a drive position and not "Park" or "Neutral"), transistor Q1 is rendered current non-conducting by virtue of pull-up resistor R connected between the ignition run circuit C12 which is at 12 volts and the ignition start circuit C10. In effect, the pull-up resistor R raises the voltage at gate G1 to a sufficiently high level (logic "high" level such as greater than the threshold voltage) to render the transistor Q1 current non-conducting. At the same time, transistor Q2 is rendered current non-conducting by virtue of safety switch 530 being open and gate G2 being connected to a path to ground through the starter relay circuit C14 and the starter relay coil 534.

Thus, both transistors Q1 and Q2 are current non-conducting when the ignition switch mechanism is in the "Run" position and the shift lever 328 is in a drive position such as R, D, 1, 2 or 3.

In effect, the ignition start circuit C10 monitors only the "Start" position of the ignition switch mechanism 522 while the ignition run circuit C12 monitors the "Run" position and "Start" position of the ignition switch mechanism 522. The ignition start circuit C10 and the starter relay circuit C14 both monitor the condition of the safety switch 530 (i.e., whether it is open or closed).

The logic control circuit 502 also includes an insulated gate, voltage controlled switching transistor Q3 in series with the "Run" contact 518 and the transistors Q1,Q2 in the ignition run circuit C12. The transistor Q3 includes gate G3 which renders transistor Q3 current conducting when it is at a low voltage state (e.g., less than the threshold voltage) and current conducting when it is at a high voltage state above the threshold voltage. The gate G3 is coupled to a brake light circuit C18 having a brake pedal responsive mechanical switch 360 and one or more brake lights 362 controlled by the switch 360 in usual fashion. Brake pedal responsive switch 360 is closed when the vehicle brake pedal is in the brake applied position to brake the vehicle wheels. When the switch 360 is closed, the brake light circuit C18 is energized by the power source 515 at 12 volts and energizes the brake lights 362 t ground. Moreover, when the switch 360 is closed, the gate G3 of transistor Q3 is at 12 volts and is thus rendered current non-conducting when the brake pedal is in the brake applied position.

When the switch 360 is open as a result of the brake pedal being in the brake release position, the transistor Q3 is rendered current conducting by virtue of gate G3 being at the low voltage state (e.g., less than the threshold voltage) provided by the path to ground through the brake light 362.

As a result, transistor Q3 is rendered current conducting when the service brake pedal is in the brake release position and current non-conducting when the service brake pedal is in the brake applied position.

Diodes D1, D2, D3 and D4 are provided in the circuit 502 to protect the transistors Q1, Q2 and Q3 against damage from current flow resulting from drain back EMF when coil 534 and solenoid 503 are deenergized during operation of the circuit. As is well known, the diodes D1, D2, D3, D4 block current flow to ground.

The solenoid 503 is connected in series with transistors Q1,Q2,Q3 and comprises a conventional push type electrical solenoid (e.g., model 26P-C-12VDC) available from Guardian Electric Co.). The solenoid 503 includes a push rod or plunger 57 that is extended when the solenoid is energized and retracted by spring 572 when the solenoid is deenergized. Stop 573 adjustably limits the extent of retraction of the push rod 570.

The support base 302 includes a flange 574 adjacent the solenoid, FIG. 18, and having an aperture 576 coaxial with the push rod 570 to receive the push rod 570 in the retracted and extended positions. The support base 302 includes another aperture 580 coaxial with aperture 576.

When the shift lever 328 is placed in the "Park" position and the pushbutton 346 released, the bellcrank 410 is pivoted to a locking position relative to the pawl member 316, FIGS. 14-15, as in the embodiment described hereinabove for FIGS. 1-12. When the bellcrank 410 is in the locking position, the retaining flange 500 thereof is pivoted between the support frame 302 and the support flange, FIGS. 14, 15 and 18 with an aperture 584 in the retaining flange aligned coaxially with the apertures 576,580 of the support base. Prior to release of the pushbutton 346 with the shift lever in "Park", aperture 584 will not be coaxially aligned with apertures 576,580.

When the ignition switch mechanism is subsequently placed in the "Start" position or "Run" position with the shift lever 328 in the "Park" position and the service brake pedal is in the brake release position (i.e., vehicle service brake pedal not applied), either transistor Q1 or Q2 is rendered current conducting (depending on the position of the ignition switch mechanism 522) and the transistor Q3 is rendered current conductive to energize the solenoid 503 from the power source 515 and cause its push rod 570 to extend through coaxially aligned apertures 576, 580, 584, FIG. 18. When the push rod 570 is received in the apertures 576,580,584, the push rod 570 mechanically blocks movement of the retaining flange 500 of the bellcrank 410. Since the bellcrank 410 is blocked against movement, the pushbutton on the shift lever handle cannot be depressed enough to remove the shift lever 328 from the "Park" position, e.g., see FIG. 14.

However, once the vehicle brake pedal is thereafter depressed to place it in the brake applied position, the transistor Q3 is rendered current non-conducting, causing deenergization of the solenoid 503 and movement of the push rod 570 to the retracted position, FIG. 16, to allow free rotation of the bellcrank 410 when the ignition switch mechanism is in the "Start" position or "Run" position. In particular, bellcrank 410 can be caused to pivot downward to the unlock position, FIG. 16, by the transfer of the driver's finger force on button 346 to rod 329 and coupling pin 431.

The driver depresses the pushbutton on the shift lever handle and pivots the shift lever 328 from the "Park" position to another position such as N, R, D, 1, 2 or 3. The locking pin 434 will move with the carrier member 308 and prevent actuation of the ignition switch mechanism to the "Lock" position so long as the shift lever is in a position other than "Park".

Moreover, when the shift lever 328 is in a position other than "Park" position or "Neutral" position as explained below, the solenoid 503 is not energized by virtue of transistors Q1,Q2 both being in the current non-conducting condition.

Of course, the solenoid 503 is not energized when the ignition switch mechanism is in the "Lock" position or when the power supply means 515 is inoperative to provide power (e.g., when the battery is dead).

When the ignition switch mechanism is in the "Off" position, no electrical power is supplied to the logic control circuit 502 and the shift lever is unlocked for shifting among its various operative positions. The steering wheel is also unlocked for movement when the ignition switch mechanism is in the "Off" position.

In the embodiment of FIGS. 13-17, the solenoid 503 will also be energized when the shift lever 328 is in the neutral position (i.e., closes the safety switch 530), the ignition is in the "Start" or "Run" position and the brake pedal is in the brake release position. However, since the aperture 584 in the flange 500 of the bellcrank 410 will not be positioned coaxially with apertures 576,580, the push rod 570 will only abut against a side of the flange 500 and will not extend through apertures 576,580,584. The push rod 570 will, as a result, not mechanically block its movement of the bellcrank 410. As a result, the shift lever 328 can be moved from the neutral position N regardless of whether the brake pedal is in the brake release position or brake applied position.

As stated above, apertures 576,580,584 are coaxially aligned when the shift lever is in the "Park" position and the pushbutton 346 is released. When the solenoid 503 is energized (brake pedal released) with the apertures 576,580,584 coaxially aligned, the push rod 570 can extend through these apertures to block movement of the bellcrank 410.

The brake and shift lever interlock system of FIGS. 13-19 is operable to lock the shift lever 328 only when the ignition switch mechanism 522 is in the "Start" or "Run" position, the shift lever 328 is in the "Park" position and the brake pedal 206 is in the brake release position. For other input sequences, the brake and shift lever interlock system is not operable to lock the position of the shift lever 328.

Figure 20:
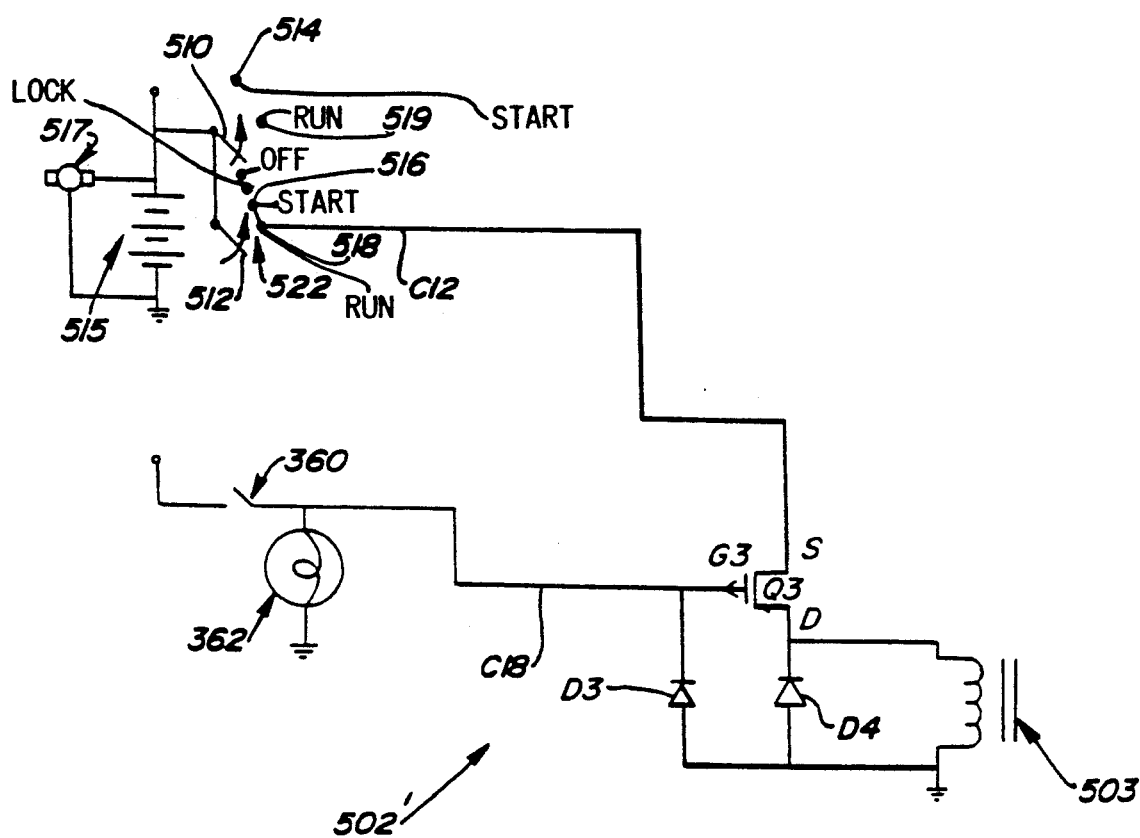

Referring to FIG. 20, a simpler control circuit 502' is shown for use with the shift control mechanism 300 of FIGS. 13-18 in lieu of the control circuit 502 shown in FIG. 19. In FIG. 20, like features of FIG. 19 are represented by like reference numerals/letters. The control circuit 502' is simpler than the control circuit 502 of FIG. 19 in that only the ignition switch mechanism 522 and the brake pedal responsive switch mechanism 360 plus switching transistor Q3 are employed.

In FIG. 20, the ignition run circuit C12 is energized when the ignition switch mechanism 522 is in the "Start" position or the "Run" position. The switching transistor Q3 is rendered current conducting when the service brake pedal is in the brake release position (brake pedal responsive switch 360 being open) and is rendered current non-conducting when the service brake pedal is in the brake applied position. As a result, the push-type solenoid 503 is energized when the ignition switch mechanism 522 is in the "Start" or "Run" position and the service brake pedal is in the brake release position regardless of the position of the shift lever 328 of FIGS. 13-18. The energized solenoid 503 functions to block the retaining flange 500 of the bellcrank 410 only when the shift lever 328 is in the "Park" position with pushbutton 346 released (i.e., to coaxially align apertures 576,580,584 as explained hereinabove to permit the solenoid push rod 570 to be received in the aligned apertures 576,580,584). At other times when the ignition switch mechanism 522 is in the "Start" or "Run" position and the brake pedal switch 360 is open (brake pedal released), the push rod 570 of the energized solenoid will be extended but only abut against a side of the retaining flange 500 of the bellcrank 410 since the apertures 576,580,584 are not coaxially aligned at these times. Thus, the push rod 570, although extended, will not mechanically block the movement of the bellcrank 410. As a result, except when the shift lever is in the "Park" position with the pushbutton 346 released, the shift lever 328 can be moved among its operative positions regardless of whether or not the service brake pedal is applied. However, when the shift lever 328 is positioned in the "Park" position with the pushbutton 346 released, the push rod 570 of the energized solenoid 503 will enter apertures 576,580,584 and the shift lever 328 can only be moved out of the "Park" position if the brake pedal is applied to close switch 360 and render switching transistor Q3 current non-conducting to deenergize solenoid 503. As mentioned hereinabove, the coupling means (i.e., coupling slot 417 and coupling pin 431) effects the desired coaxial alignment of apertures 576,580,584 only when the shift lever is in the "Park" position and the pushbutton 346 is released.

Referring to FIG. 21, an even more simple control circuit 502" is shown for use with the shift control mechanism 300 of FIGS. 13-18 in lieu of the control circuit 502. In FIG. 21, like features of FIG. 19 are represented by like reference number/letters. The control circuit 502" is simpler in that only the brake pedal responsive mechanical switch 360 is employed to energize or deenergize the solenoid 505 which is a pull-type solenoid, not a push TM type as used in the previous embodiments.

In FIG. 21, the brake light circuit C18 is energized whenever the service brake pedal is applied to close the switch 360. Closure of switch 360 energizes the brake light 362 and also the pull-type solenoid 505 to retract its plunger or pull rod. When deenergized, the plunger of the solenoid 505 is extended by spring bias. Although the solenoid plunger is extended when the ignition switch mechanism is the "Start" or "Run" position and the service brake pedal is released, the plunger cannot enter the apertures 576,580,584 unless the shift lever is in the "Park" position with the pushbutton 346 released. When the shift lever is in the "Park" position with the pushbutton 346 released, the apertures 576,580,584 are coaxially aligned, e.g., FIG. 18. The spring biased solenoid plunger is received in the apertures 576,580,584 at that time to mechanically block movement of the retaining flange 500 of the bellcrank 410 (FIG. 18). In order to move the shift lever from the "Park" position with the ignition switch mechanism in the "Start" or "Run" position, the driver must apply the service brake pedal to close switch 360 and energize the solenoid 505 to pull its plunger out of the apertures 576,580,584, thereby freeing the bellcrank 410 for movement by the driver's depressing the pushbutton 346 prior to shifting. When the shift lever is moved to positions other than "Park" with the pushbutton 346 released, the spring biased solenoid plunger will only abut against a side of the retaining flange 500 of the bellcrank 410 and thus will not mechanically block movement of the bellcrank 410. The shift lever thus can be moved among the other operative positions regardless of whether or not the service brake is applied.

While the invention has been described in terms of specific embodiments thereof, it is not intended to be limited thereto but rather only to the extent set forth hereafter in the following claims.

We claim:

1. An interlock system for a vehicle having a transmission, an engine and a service brake system operable in a brake applied mode and a brake release mode, comprising:

(a) shift lever means movable between a non-drive position and a drive position, (b) detent means for releasably retaining the shift lever means in a selected position, (c) an ignition switch mechanism having a "Lock" position, a "Start" position to start the engine and a "Run" position to operate the engine, (d) a locking lever operably connected to the ignition switch mechanism by connecting means, (e) said connecting means moving said locking lever to a locking position when the ignition switch mechanism is moved to the "Lock" position with the shift lever releasably retained in said non-drive position such that said locking lever in said locking position prevents actuation of the detent means to release the shift lever when the ignition switch mechanism is in the "Lock" position, and (f) lever locking means responsive to the mode of the service brake system for engaging the locking lever in said locking position independently of said connecting means to block movement of the locking lever when the shift lever is in the non-drive position with the ignition switch mechanism in the "Start" position or "Run" position and with the service brake system in the brake release mode and for disengaging from the locking lever to enable movement thereof from said locking position when the shift lever is in the non-drive position with the ignition switch mechanism in the "Start" position or "Run" position and with the service brake system in the brake applied mode such that said shift lever can be moved to the drive position.

2. The interlock system of claim 1 wherein said lever locking means comprises a solenoid.

3. The interlock system of claim 1 wherein said locking lever comprises a bellcrank.

* * * * *